Patented Nov. 29, 1938

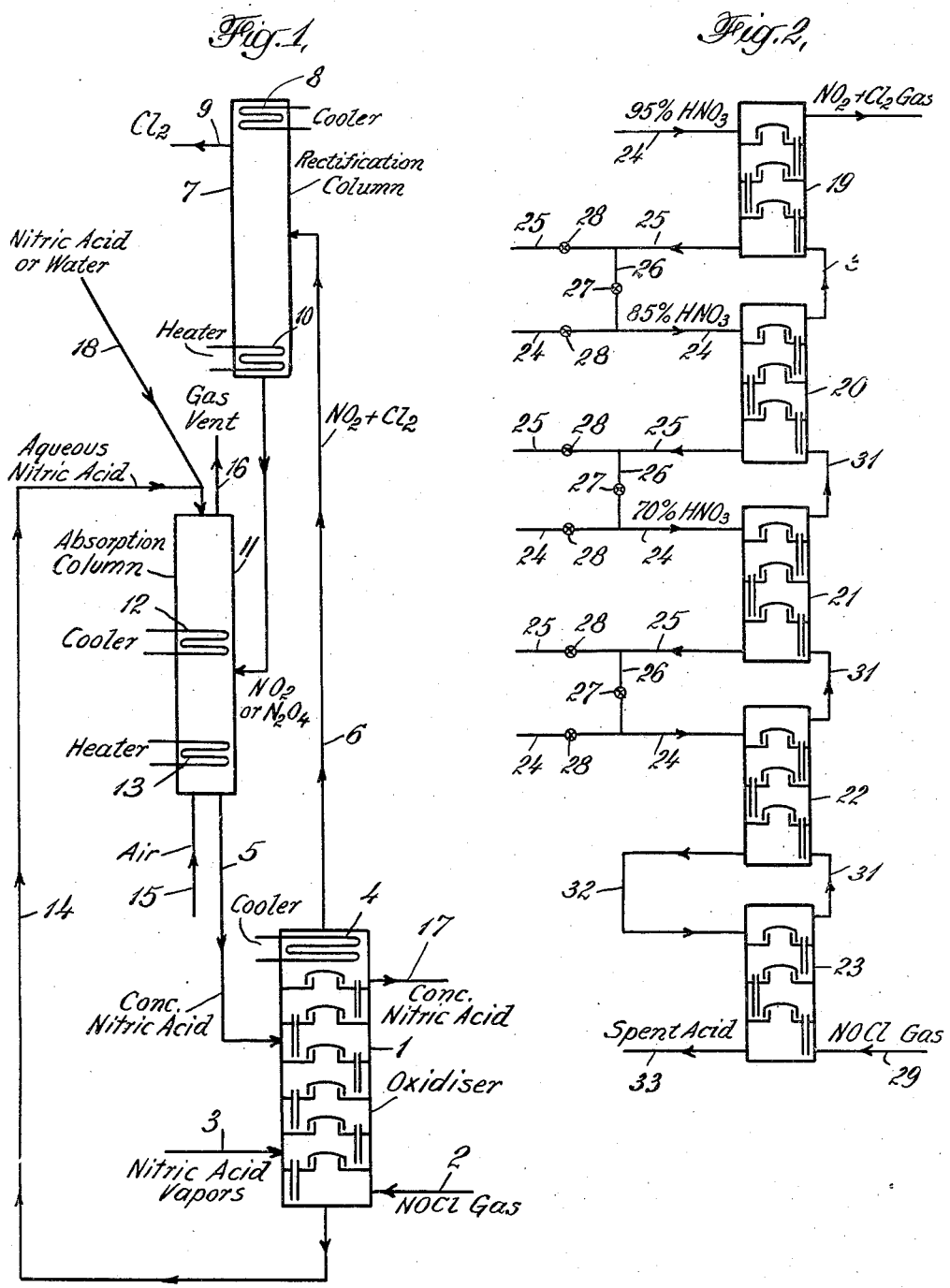

2,138,017

UNITED STATES PATENT OFFICE 2,138,017

PROCESS FOR THE DECOMPOSITION OF NITROSYL CHLORIDE

Herman A. Beekhuis, Jr., Petersburg, Va., assignor to The Solvay Process Company, New York, N. Y., a corporation of New York Application February 19, 1937, Serial No. 126,621

19 Claims. (Cl. 23—157)

This invention relates to a process for the decomposition of nitrosyl chloride. More particularly, this invention relates to a process whereby nitrosyl chloride may be treated with nitric acid to substantially completely decompose the nitrosyl chloride and form nitrogen oxides and chlorine.

It is known that nitrosyl chloride may be oxidized by means of gaseous oxygen to convert the nitrosyl chloride into a mixture of nitrogen dioxide and chlorine. The reaction may be carried out merely by heating a mixture of nitrosyl chloride gas and air, for example, to a high temperature or the rate with which the nitrosyl chloride is decomposed may be increased by passing the hot mixture of gases in contact with a catalyst. For each temperature of operation there is an equilibrium for the reaction, there being also the tendency for nitrogen dioxide and chlorine to react to form nitrosyl chloride and oxygen. In utilizing this reaction between nitrosyl chloride and oxygen the gaseous products obtained contain a substantial proportion of undecomposed nitrosyl chloride. In order to recover all of the chlorine originally combined in the nitrosyl chloride separate from the fixed nitrogen of the nitrosyl chloride, therefore, it is necessary repeatedly to oxidize a part of the nitrosyl chloride, separate the unoxidized nitrosyl chloride from the chlorine and nitrogen dioxide formed, and again oxidize the recovered nitrosyl chloride.

It is an object of this invention to provide a process whereby nitrosyl chloride may be substantially completely decomposed to free chlorine and nitrogen oxides (principally to nitrogen dioxide, $NO_2$ or $N_2O_4$, and these nitrogen oxides will hereinafter be referred to as nitrogen dioxide) in a single treatment of the nitrosyl chloride. Following this decomposition of the nitrosyl chloride, substantially all of the fixed nitrogen and chlorine contained in the original nitrosyl chloride may be completely recovered as nitrogen oxides and free chlorine without the necessity of repeatedly separating undecomposed nitrosyl chloride from the decomposition products and again treating the nitrosyl chloride to decompose it.

In carrying out the process of this invention nitrosyl chloride or a gas containing nitrosyl chloride as, for example, the mixture of nitrosyl chloride and chlorine which is produced by reacting nitric acid and a metal chloride such as sodium chloride, is passed in contact with hot concentrated nitric acid under conditions such that the gas is contacted at a temperature of about 50° C. or higher with acid of a concentration corresponding to an aqueous nitric acid containing 70% or more $HNO_3$ and is subsequently contacted with an acid of higher concentration. The process of this invention may be carried out by passing the nitrosyl chloride gas in contact with the hot concentrated nitric acid, cooling the resulting mixture of gases and vapors containing water vapor and nitric acid vapor evolved from the hot concentrated acid and chlorine and nitrogen dioxide resulting from decomposition of the nitrosyl chloride, to condense water and nitric acid, and refluxing the condensate thus formed in contact with the gases and vapors resulting from the treatment of the nitrosyl chloride gas with the hot concentrated nitric acid. A concentrated nitric acid having vapor pressures of $HNO_3$ and $H_2O$ such that the composition of vapors evolved from the acid when it is heated at a temperature between 50° C. and its boiling point corresponds to 70 parts or more by weight of $HNO_3$ to every 30 parts of $H_2O$, should be contacted with the nitrosyl chloride. For an aqueous solution of nitric acid alone, this corresponds to a solution containing 70% or more $HNO_3$. Accordingly, when reference is made in this specification and the appended claims to an acid of a concentration corresponding to a nitric acid of a given percent, it is intended to refer to an acid solution which when heated evolves vapors containing the same ratio by weight of $HNO_3$ to water vapor as the vapors evolved by heating an aqueous solution of nitric acid alone of the given percent composition. It is preferred to employ for the treatment of the nitrosyl chloride gas an aqueous nitric acid containing about 75% to about 85% $HNO_3$. The concentrated acid and nitrosyl chloride gas should be contacted at an elevated temperature of 50° C. or higher, preferably at about 70° C. or higher, at some point at which it is contacted with the nitrosyl chloride, and in proportions such that there is an excess of $HNO_3$ present for reaction with the nitrosyl chloride over that corresponding to the equation:

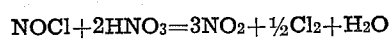

$$NOCl + 2HNO_3 = 3NO_2 + \tfrac{1}{2}Cl_2 + H_2O$$

This requires supplying more than two mols of $HNO_3$ for every 1 mol of $NOCl$. The degree of cooling the gases and vapors arising from the treatment of the nitrosyl chloride gas with the hot concentrated nitric acid to condense water vapor and nitric acid therefrom and the extent of refluxing the condensate in contact with the gases and vapors, is preferably such that a condensate is produced which contains nitric acid and water corresponding to about 80% or more $HNO_3$, preferably 90% to 100% $HNO_3$ and this condensate is refluxed in contact with the gases and vapors at a temperature of about 60° C. or higher during at least a part of the time the gases and vapors are in contact with the condensate after they have been contacted with the nitric acid introduced into contact with the nitrosyl chloride gas.

The nitric acid used for oxidizing nitrosyl chloride in accordance with this invention may contain sulfuric acid or other material dissolved in the acid. In determining the concentration of nitric acid used in carrying out the present process, the presence of sulfuric acid or material other than water and $HNO_3$ in the acid solution must be taken into account since the added material affects the ratio of $HNO_3$ to $H_2O$ in the vapor phase over the acid. Accordingly, when in this specification and claims reference is made to a nitric acid solution of a concentration corresponding to an aqueous nitric acid containing 70% $HNO_3$, it is intended to refer to an acid solution which, when heated to a temperature above 50° C., has the same ratio of nitric acid vapor pressure to water vapor pressure as an aqueous nitric acid containing 70 parts of $HNO_3$ and 30 parts of water when heated to the same temperature. For example, while a high concentration of sulfuric acid in the nitric acid is not ordinarily desirable, an acid containing not more than 60% $H_2SO_4$ and not less than 15% $HNO_3$ in which the percentage of water is not more than 30 plus 0.1 times the percentage of sulfuric acid, may be used and is equivalent to using a nitric acid solution in water containing 70% or more $HNO_3$. The foregoing percentage of water may be expressed as not more than $30 + (0.1 \times H_2SO_4)$. It is preferred, however, that the concentration of sulfuric acid should not exceed about 1 part of $H_2SO_4$ for every 1 part of $HNO_3$.

The mixture of nitrogen dioxide and chlorine resulting from the aforedescribed treatment of the nitrosyl chloride gas may be treated to recover the nitrogen dioxide separate from the chlorine. The nitrogen dioxide may be recovered either as a concentrated gas or as liquefied nitrogen dioxide, which may be reacted with oxygen and water or aqueous nitric acid to form a concentrated nitric acid for use in the decomposition of additional nitrosyl chloride. By thus reacting the nitrogen dioxide with oxygen and water, there may be produced an amount of nitric acid equivalent to that used up in the decomposition of the nitrosyl chloride plus that corresponding to the fixed nitrogen content of the nitrosyl chloride. In thus operating, the process as a whole may be considered as being one for the decomposition of nitrosyl chloride by means of oxygen gas, the nitric acid serving as an oxygen "carrier" and itself not being used up in the process.

The invention will be more completely described and illustrated by means of the following examples, although the invention is not limited thereto. In the accompanying drawing there is illustrated in Fig. 1 a procedure for the decomposition of nitrosyl chloride by means of nitric acid in accordance with the process of this invention. Fig. 1 of the drawing further illustrates a procedure whereby the nitrogen dioxide may be recovered from the gas resulting from the decomposition of the nitrosyl chloride separate from the chlorine contained in this gas and used for the production of nitric acid which is returned for decomposition of additional nitrosyl chloride. In Fig. 2 of the drawing there is illustrated a second method for oxidizing nitrosyl chloride in accordance with this invention.

Referring to Fig. 1 of the drawing, the numeral I designates an oxidizer into the bottom of which nitrosyl chloride gas is introduced from a pipe 2. This nitrosyl chloride gas may be a gas substantially consisting of nitrosyl chloride or a gas containing nitrosyl chloride diluted with other gases, for example a mixture of about equal volumes of nitrosyl chloride and chlorine such as may be formed in reacting a metal chloride, sodium chloride for example, with nitric acid. Oxidizer I is a liquid-gas contact tower containing means for intimately contacting the gas introduced into the bottom of the tower from pipe 2 and passing upwardly through the tower with liquid passing downwardly therethrough. This means for insuring intimate contact between the liquid and gas preferably is provided, as shown in the drawing, by employing a tower containing a plurality of bubbling plates. The bottom portion of tower I is provided with an inlet pipe 3 for hot vapors obtained by boiling nitric acid and the top of the tower is provided with a cooler 4.

Concentrated nitric acid containing about 80% $HNO_3$ is introduced from a pipe 5 to a bubbling plate in the mid-portion of tower I and passes downwardly through the bottom portion of the tower in contact with the rising gas. By means of the hot vapors introduced from pipe 3 sufficient heat is imparted to the gas and liquid in tower I so that in the lower portion of the tower the nitric acid is heated to a temperature of about 100° C. or somewhat higher. It is preferred also to heat the concentrated acid prior to its introduction into tower I to a temperature of about 90° C. The concentrated acid is fed to tower I in amount such that there is contacted with the nitrosyl chloride gas an excess amounting to about 100% $HNO_3$ over that required for oxidizing the nitrosyl chloride in accordance with the equation:

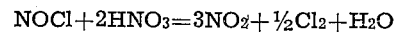

$$NOCl + 2HNO_3 = 3NO_2 + \tfrac{1}{2}Cl_2 + H_2O$$

In employing these proportions of nitric acid to nitrosyl chloride about 4 mols of nitric acid are fed to tower I for every 1 mol of nitrosyl chloride introduced thereto.

In contacting the nitrosyl chloride with the hot nitric acid in the bottom portion of tower I, nitrosyl chloride is partially oxidized to nitrogen dioxide and chlorine. The nitrogen dioxide and chlorine resulting from the oxidation of the nitrosyl chloride, together with vapors of nitric acid and water which are evolved from the hot acid and residual unoxidized nitrosyl chloride, pass upwardly through the upper portion of tower I, above the point at which the concentrated nitric acid is introduced into the tower, in contact with a descending reflux of nitric acid condensate produced by cooling the gases and vapors at the top of tower I by means of cooler 4. The gases are cooled by cooler 4 at the top of the tower to a temperature of about 30° C. and by being contacted in the upper portion of the tower with the relatively cooler condensate produced in thus cooling the gases, they are progressively cooled from about 90° C., at the plate in the mid-portion of the tower to which the concentrated nitric acid is supplied, to a temperature of about 60° C. in the upper portion of the tower at the plate just prior to cooler 4 where the gases are contacted with the condensate.

The concentration of the acid on the plate at the mid-portion of tower 1 to which the incoming 80% nitric acid is fed, will be substantially the same as that of the incoming acid. While acid on this plate is being used up by reaction with the nitrosyl chloride and water vapor rising to this plate from the acid on the lower plates of the tower is condensed in the acid, it is also being mixed with acid of a higher concentration flowing to this plate from the upper portion of the tower. The rate of supply of 80% nitric acid to the mid-plate, of nitrosyl chloride gas to the bottom of the tower, of heating the gas and acid in the lower portion of the tower and of cooling the vapors in the top of the tower are so correlated as to maintain the acid on the mid-plate at a concentration of 75% to 85% $HNO_3$. The acid condensate on the top plate will preferably contain about 98% to 100% $HNO_3$. At the relatively low temperature at which this acid is condensed, it may absorb appreciable quantities of $N_2O_4$ from the gas. The concentrations of the acid condensate are given on a $N_2O_4$ free basis. Under the conditions of operation set forth a gas of the composition:

|  | Cu. ft. |
|---|---|
| $Cl_2$ | 150 |
| NOCl | 150 |
| $H_2O$ vapor | 300 | introduced at the bottom of tower 1, was treated with nitric acid supplied to a mid-portion of the tower as 132 pounds of 80% $HNO_3$. About 470 cubic feet of a mixture of water vapor and nitric acid vapor, obtained by boiling 65% nitric acid, was introduced at a point in the lower portion of the tower to supply heat to the column. An acid containing 52% $HNO_3$ was drawn from the bottom of the tower at a temperature of about 90° C.

In the process of this example the heat required for maintaining the desired temperatures in oxidizer 1 may be supplied other than in the manner described above. For example, all or any desired portion of the heat required may be supplied by a heater provided in the bottom portion of the oxidizer or by the introduction to tower 1 of steam or of vapors obtained by boiling nitric acid.

A gas substantially consisting of nitrogen dioxide and chlorine leaves the top of tower 1. The completeness with which the nitrosyl chloride is decomposed in tower 1 depends upon both the strength of acid with which the gases are contacted in the tower and the temperatures at which the acid and gas are contacted. The following table illustrates three sets of conditions with respect to concentration and temperature of the nitric acid on the plate in the middle of the tower to which fresh acid is supplied and on the top plate of the tower, which may be maintained in tower 1 to accomplish the same degree of decomposition of the nitrosyl chloride:

| | Mid-plate | Top plate |
|---|---|---|
| (1) | 80% $HNO_3$ at 70° C. | 100% $HNO_3$ at 30° C. |
| (2) | 75% $HNO_3$ at 85° C. | 90% $HNO_3$ at 60° C. |
| (3) | 70% $HNO_3$ at 100° C. | 80% $HNO_3$ at 90° C. |

An increase in any of these concentrations of acid or temperatures increases the completeness with which the nitrosyl chloride is decomposed. The above conditions, therefore, represent the correlated minimum concentrations of acid and temperatures at the two points of contact between the nitrosyl chloride gas and nitric acid represented by the point at which fresh nitric acid containing 70% or more $HNO_3$ is contacted with the gas and a point at which the gas is subsequently treated with the nitric acid condensate. The conditions of operation illustrated in the above table, involve contacting the nitrosyl chloride gas with an acid of a concentration corresponding to 70% or more nitric acid at a temperature of 70° C. or higher and subsequently contacting the gas with an acid of a concentration corresponding to 80% to 100% nitric acid at a temperature not below a minimum temperature of 30° C. for 100% nitric acid and of 30° C. plus 3° C. for each decrease of 1% in the concentration of the nitric acid below 100%.

The gas from the top of tower 1 is passed through a pipe 6 to a rectification column 7. This rectification column is a tower provided with means for intimately contacting liquid passing downwardly through the column with gas passing upwardly therethrough. Column 7 is provided with a cooler at the top of the column and with a heater at the bottom of the column.

The nitrogen dioxide-chlorine gas is introduced into the mid-portion of rectification column 7. The entering gas passes upwardly in the upper portion of the column where it is refluxed in intimate contact with a downwardly flowing condensate of liquid chlorine. The chlorine gas reaching the top of column 7 is liquefied by means of cooler 8. A portion of this liquefied chlorine passes downwardly in the upper portion of the rectification column to provide the reflux with which the nitrogen dioxide-chlorine gas mixture is treated, in amount sufficient to free the gas substantially completely of nitrogen dioxide during its passage through the upper portion of the column. Another portion of the substantially pure chlorine liquefied in the top of the column is drawn off through pipe 9 as one of the products of this process.

The liquid chlorine refluxing downwardly in rectification column 7 cools and condenses and absorbs the nitrogen dioxide in the gases introduced into the column. The thus liquefied nitrogen dioxide flows to the bottom of the column where it is heated by means of heater 10 and the vapors evolved pass upwardly through the bottom portion of the column in contact with the liquid flowing downwardly therein. The heated vapors free the liquid of chlorine. A substantially pure liquefied nitrogen dioxide is drawn from the bottom of rectification column 7 and either as the liquid or after being vaporized to form a concentrated nitrogen dioxide gas, is introduced into an absorption column 11 in which it is reacted with aqueous nitric acid.

Absorption column 11 is a tower provided with means, not shown in the drawing, for intimately contacting liquid and gas passing countercurrent therethrough. The column is provided at a point just above the point of entry of the nitrogen dioxide with a cooler 12 and in the bottom portion of the column with a heater 13. Aqueous nitric acid from the bottom of tower 1 is passed through a pipe 14 into the top of column 11. In column 11 the aqueous nitric acid is reacted with the nitrogen dioxide to form a concentrated nitric acid containing about 80% $HNO_3$. Air is introduced into the bottom of column 11 from a pipe 15 to supply oxygen for the reaction of the nitrogen dioxide with the water in the aqueous nitric acid. The reaction of the nitrogen dioxide and water is facilitated by maintaining a pressure above atmospheric, for example about 100 pounds per square inch. Unabsorbed gases are vented from column 11 through a pipe 16.

In the process illustrated in this example the fixed nitrogen of the nitrosyl chloride gas is ultimately converted in column 11 into HNO₃. A corresponding quantity of HNO₃ is withdrawn from the process as a nitric acid containing 80% or more HNO₃ from the top of tower 1 through a pipe 17. The water required for reaction with the nitrogen dioxide and oxygen and to make up for any losses of water from the system may be introduced to the top of column 11 from a pipe 18 either as water or as an aqueous nitric acid.

The process illustrated in Fig. 1 is in effect a process for the distillation of concentrated nitric acid, with a nitrosyl chloride gas being passed in contact with the acid being distilled and, together with the vapors evolved from the acid, in contact with the condensate from the distilled vapors. This nitric acid distillation procedure involves heating the acid at the midplate of the column to a temperature of 50° C. or higher at which the nitric acid is distilled due to the continuous passage of gas in contact with the heated acid. The distilled vapors are condensed at the top of the tower, and the condensate and vapors rising through the tower are subjected to a rectification treatment by refluxing the condensate in contact with the vapors. While thus distilling the nitric acid, the gas containing nitrosyl chloride is passed in direct contact with the acid being distilled. The nitrosyl chloride gas is thus mixed with the vapors distilled from the acid solution and accompanies these vapors during their contact with the refluxed condensate in the rectification procedure taking place in the upper portion of the tower.

A second procedure for carrying out the process of this invention is illustrated in Fig. 2 of the accompanying drawing. In this figure the numerals 19, 20, 21, 22 and 23 designate five vessels or towers designed to intimately contact a gas with a liquid. For example, each vessel or tower may contain a series of bubbling plates as shown in the drawing, or it may contain a packing over which the liquid is distributed to intimately contact it with a gas passing through the tower. Each of towers 19, 20, 21 and 22 is provided at the top with an inlet for nitric acid 24, and each of towers 19, 20 and 21 is provided at the bottom with an outlet 25 for the acid which has passed through the tower. A pipe 32 communicates between towers 22 and 23 for passage of acid from the bottom of tower 22 to the top of tower 23. A pipe 33 serves for the withdrawal of spent acid from the bottom of tower 23. The pipes 26 with valves 27 communicate between the outlet of towers 19, 20 and 21 and the inlet to towers 20, 21 and 22, respectively. Valves 28 are provided in the outlets from towers 19, 20 and 21 and the inlets to towers 20, 21 and 22. A gas inlet pipe 29 communicates with the bottom of tower 23 and a gas outlet pipe 30 with the top of tower 19. Pipes 31 communicate between the tops of towers 20, 21, 22 and 23 and the bottoms of towers 19, 20, 21 and 22, respectively, for the passage of gas from the top of each tower to the bottom of the succeeding tower in the series.

The apparatus described above and illustrated in Fig. 2 may be employed for the decomposition of nitrosyl chloride in the following manner:

With valves 28 open and valves 27 closed, 95% nitric acid is introduced to the top of tower 19, is passed through this tower and is withdrawn through pipe 25. 85% nitric acid is similarly passed through tower 20, 70% nitric acid through tower 21, and an acid of a concentration below 70% HNO₃ (for example, about 50% HNO₃) is passed to the top of tower 22, through this tower, and thence through pipe 32 to the top of tower 23. After passing through tower 23 the acid is withdrawn from the bottom of this tower through pipe 33. Before introduction into each of the towers, the nitric acid is heated to a temperature of 80° C. Nitrosyl chloride gas is passed into the bottom of tower 23 from pipe 29 and in succession through each of towers 23, 22, 21, 20 and 19, passing from one tower to the next in the series through pipes 31. The thus treated gas leaves the top of tower 19 through pipe 30. The nitrosyl chloride gas is heated to about 80° C. prior to its introduction into tower 23. Instead of heating the gas, provision may be made for heating the acid passing from tower 22 to tower 23 to about 80° C. The desired supply of heat to tower 23 may also be accomplished, as in the oxidizer of the preceding example, by introducing into tower 23 hot vapors obtained by boiling nitric acid.

In operating in accordance with this procedure, the nitrosyl chloride entering tower 23 is partially oxidized in this tower and in tower 22 by the hot nitric acid with which it is contacted therein. The thus treated gas is then passed in contact with 70% nitric acid in tower 21 and with acid containing progressively higher concentrations of nitric acid in towers 20 and 19, whereby the nitrosyl chloride unoxidized in towers 22 and 23 is substantially completely decomposed, forming nitrogen dioxide and chlorine.

The apparatus illustrated in Fig. 2 may also be employed to carry out the procedure of this invention in the following manner:

With valves 28 closed and valves 27 open, 95% nitric acid is introduced to the top of tower 19 through pipe 24 leading to this tower. Nitrosyl chloride gas is introduced into the bottom of tower 23 through pipe 29. The acid entering tower 19 is heated and heat is supplied to tower 23, either by injecting vapors from boiling nitric acid or in any other desired manner, to maintain temperatures of about 80° C. in the series of towers 19, 20, 21, 22 and 23. The gas passes in immediate succession through each of the towers of the series in contact with the acid which passes successively through towers 19, 20, 21, 22 and 23, in the reverse order to that at which the gases pass through the series. The spent acid is withdrawn from the bottom of tower 23. In thus treating the nitrosyl chloride gas with the hot concentrated acid the nitrosyl chloride is substantially completely decomposed to nitrogen dioxide and chlorine.

In each of the above examples the nitrosyl chloride gas is first treated with nitric acid of a concentration below 70% HNO₃ at a temperature of 50° C. or higher to partially decompose the nitrosyl chloride before the gas is contacted with the 70% or stronger nitric acid. Such a procedure is particularly economical, since it permits of using a relatively dilute acid to accomplish a part of the decomposition. It is possible, however, to pass the nitrosyl chloride directly into contact with the acid of 70% HNO₃ concentration or stronger, although this mode of operation requires a greater supply of concentrated acid in order that the concentration of the acid with which the gas is treated may be maintained at 70% or more $HNO_3$.

It will be noted that the processes described as illustrations of methods for practicing this invention involve passing the gas containing nitrosyl chloride through an immediate succession of stages wherein the gas is intimately contacted with nitric acid. In Example 1 the contact of the gas with each of the pools of acid on the bubbling plates in oxidizer 1 represents one such stage. Similarly, in Example 2, the contact of the gas and liquid in each of the towers represents one such stage, or one may consider the contact of gas and liquor on each of the plates in the towers as one stage. As the gas proceeds from one plate to the next, it is treated with acid of progressively higher concentration and on one or more of the plates the gas is treated with an acid having a concentration corresponding to 70% nitric acid or stronger before the final treatment of the gas with still stronger acid.

In thus operating, the concentration of nitric acid contacted with the nitrosyl chloride gas determines the composition of the gas phase present, in which it appears the reaction of the nitrosyl chloride and nitric acid may take place. In contacting the heated acid and gas as described, a gas containing nitrosyl chloride and vapors of nitric acid and water, evolved from the 70% or stronger nitric acid, in the proportions of 70 parts or more $HNO_3$ to 30 parts of water vapor is formed and heated to oxidize the nitrosyl chloride. As the gas and vapors are cooled and rectified, the ratio of condensed water vapor to nitric acid is greater than the ratio of water vapor to nitric acid vapor in the gases. Accordingly, the proportion of nitric acid vapor to water vapor in the gas is increased by the cooling and rectification of the gas and vapors in contact with liquid nitric acid (the condensate from the gases) of a concentration corresponding to 70% or stronger nitric acid. The increased proportion of nitric acid vapor to water vapor corresponds to that in a gas phase substantially in liquid equilibrium with nitric acid of a concentration corresponding to that of the condensate with which the gas and vapors are contacted. Thus, when the condensate with which the gas and vapors are contacted contains 90% $HNO_3$ and 10% $H_2O$, the ratio of $HNO_3$ to $H_2O$ in the gas is about 80 to 1. By thus treating the nitrosyl chloride with nitric acid, it is oxidized to nitrogen dioxide and chlorine.

Numerous changes and modifications may be made in the processes described without departing from the scope of the invention. For example, the mixture of nitrogen dioxide and chlorine obtained by oxidation of the nitrosyl chloride may be treated to absorb the nitrogen dioxide in a liquid absorbent and the absorbed nitrogen dioxide subsequently recovered. The nitric acid leaving the bottom of tower 1 need not be reacted with the nitrogen dioxide formed by the oxidation of the nitrosyl chloride but, instead, may be utilized for some other purpose and concentrated nitric acid from another source be supplied to tower 1. It is one of the advantages of the process of this invention that while providing for substantially complete decomposition of nitrosyl chloride and recovery of its fixed nitrogen content separate from its chlorine content, the procedure for decomposing the nitrosyl chloride may be so operated as to produce simultaneously a highly concentrated nitric acid containing 80% or more $HNO_3$ from a more dilute acid.

I claim:

1. The process for the decomposition of nitrosyl chloride which comprises passing said nitrosyl chloride in contact with hot nitric acid solution at a temperature of substantially 50° C. or higher, said nitric acid solution being of a concentration such that when heated at a temperature between 50° C. and the boiling point of the solution the vapors evolved from said solution contain 70 parts or more $HNO_3$ to every 30 parts $H_2O$, and then passing the resulting mixture of gases and vapors in contact with nitric acid solution of a higher concentration than that of the first mentioned acid.

2. The process for the decomposition of nitrosyl chloride which comprises passing a gas containing nitrosyl chloride through a succession of stages wherein the gas is intimately contacted with nitric acid containing progressively higher concentrations of nitric acid as the gas proceeds from one stage to a succeeding stage, and in one or more of said stages prior to the stage in which the gas is last contacted with the nitric acid, contacting the gas at a temperature of 50° C. or higher with an acid of a concentration such that when said acid is heated at a temperature between 50° C. and the boiling point of the acid the vapors evolved therefrom contain 70 parts or more $HNO_3$ to every 30 parts of water.

3. The process for the decomposition of nitrosyl chloride which comprises passing a gas containing nitrosyl chloride through a succession of stages wherein the gas is intimately contacted with nitric acid containing progressively higher concentrations of nitric acid as the gas proceeds from one stage to a succeeding stage, and in one or more of said stages, contacting the gas with 70% or stronger nitric acid at a temperature of 70° C. or higher and in one or more succeeding stages contacting the gas with an acid containing 80% to 100% nitric acid at a minimum temperature of 30° C. for 100% nitric acid and of 30° C. plus 3° C. for each 1% decrease in the concentration of the nitric acid below 100%.

4. The process for the decomposition of nitrosyl chloride which comprises passing said nitrosyl chloride in contact with a nitric acid solution at a temperature above 50° C., said nitric acid solution being of a concentration such that when heated at a temperature between 50° C. and the boiling point of the solution the vapors evolved from said solution contain 70 parts or more $HNO_3$ to every 30 parts of $H_2O$, cooling the resulting mixture of gases and vapors to condense therefrom nitric acid and refluxing said condensed nitric acid in contact with said mixture of gases and vapors.

5. The process for the decomposition of nitrosyl chloride which comprises passing said nitrosyl chloride in countercurrent flow in contact with nitric acid at a temperature of substantially 70° C. or higher, said nitric acid solution being of a concentration such that when heated at a temperature between 50° C. and the boiling point of the solution the vapors evolved from said solution contain 70 parts or more $HNO_3$ to every 30 parts $H_2O$, and then passing the resulting gases and vapors in contact with a nitric acid condensate formed by cooling said gases and vapors, the degree of cooling and of refluxing the gases and vapors with the condensate being such that the gases and vapors pass in contact with a nitric acid condensate containing 80% or more HNO₃.

6. The process for the decomposition of nitrosyl chloride which comprises passing said nitrosyl chloride in contact with a nitric acid solution at a temperature of substantially 70° C. or higher, said nitric acid solution being of a concentration such that when heated at a temperature between 50° C. and the boiling point of the solution the vapors evolved from said solution containing the same proportions of HNO₃ to H₂O as do the vapors evolved by heating at a temperature between 50° C. and its boiling point an aqueous solution of nitric acid containing about 75% to about 85% HNO₃, cooling the gases and vapors resulting from the aforesaid treatment of the nitrosyl chloride gas to condense therefrom nitric acid and refluxing the condensed nitric acid in contact with said gases and vapors after they have passed in contact with the aforesaid nitric acid solution.

7. The process for the decomposition of nitrosyl chloride which comprises passing said nitrosyl chloride in contact with nitric acid containing about 75% to about 85% HNO₃ at a temperature of substantially 70° C. or higher, cooling the gases and vapors resulting from the aforesaid treatment of the nitrosyl chloride gas to condense therefrom nitric acid and refluxing the condensed nitric acid in contact with said gases and vapors prior to the aforesaid cooling, and in said treatment of the gases and vapors regulating the proportion of said nitric acid containing about 75% to about 85% HNO₃ to nitrosyl chloride and the degree of cooling and of refluxing the condensate in contact with the gases and vapors so that condensate produced by said cooling contains about 90% or more HNO₃ and is refluxed in contact with the gases and vapors at a temperature of substantially 60° C. or higher.

8. The process for the decomposition of nitrosyl chloride which comprises distilling at a temperature of 50° C. or higher a nitric acid solution of a concentration such that when heated at a temperature between 50° C. and the boiling point of the nitric acid solution the vapors evolved from said acid solution contain 70 parts or more HNO₃ to every 30 parts of H₂O, cooling the vapors distilled from said acid to condense nitric acid therefrom, subjecting the nitric acid condensate and the vapors distilled from said nitric acid solution to rectification by refluxing the condensate in contact with said vapors and passing a gas containing nitrosyl chloride in direct contact with said nitric acid solution while it is being distilled, whereby said gas is mixed with the vapors distilled from the nitric acid solution and accompanies said vapors during their contact with said condensate in the aforesaid rectification.

9. The process for the decomposition of nitrosyl chloride which comprises distilling at a temperature of 70° C. or higher a nitric acid solution of a concentration such that when said nitric acid solution is heated at a temperature between 50° C. and its boiling point the vapors evolved therefrom contain 70 parts or more HNO₃ to every 30 parts of H₂O, cooling the vapors distilled from said acid to condense therefrom a nitric acid condensate containing 80% to 100% HNO₃, said vapors being cooled to obtain a condensate at a minimum temperature of 30° C. in condensing an acid condensate containing 100% HNO₃ and a minimum temperature of 30° C. plus 3° C. for each decrease of 1% in the concentration of acid in the condensate below 100%, subjecting the acid condensate and the vapors distilled from said nitric acid solution to rectification by refluxing the condensate in contact with said vapors, and passing a gas containing nitrosyl chloride in direct contact with said nitric acid solution while it is being distilled, whereby said gas is mixed with the vapors distilled from the nitric acid solution and accompanies said vapors during their contact with said condensate in the aforesaid rectification.

10. The process for the decomposition of nitrosyl chloride which comprises distilling a nitric acid solution containing 70% or more HNO₃ and condensing vapors evolved from said acid solution to obtain a nitric acid condensate containing a higher concentration of nitric acid than said acid solution, subjecting the nitric acid condensate and the vapors distilled from the nitric acid solution to rectification by refluxing the condensate in contact with said vapors, further vaporizing nitric acid vapors from the residue containing below 70% HNO₃ resulting from the distillation of aforesaid nitric acid solution, passing the last mentioned nitric acid vapors in contact with the said nitric acid solution while it is being distilled, and passing a gas containing nitrosyl chloride in direct contact with said residue and said nitric acid solution while vaporizing nitric acid from the residue and distilling the acid solution whereby the gas containing nitrosyl chloride is mixed with the vapors evolved from the residue and acid solution and accompanies said vapors during their contact with the nitric acid solution and the condensate refluxed in contact with the vapors evolved in distilling the nitric acid solution.

11. The process for the decomposition of nitrosyl chloride which comprises passing said nitrosyl chloride in countercurrent flow with nitric acid in a plurality of stages, first in one of said stages in contact with nitric acid containing 70% or more HNO₃ at a temperature of substantially 70° C. or higher and then in another of said stages passing the gases and vapors formed in the treatment of the nitrosyl chloride gas in the preceding stage in contact with nitric acid condensate formed by cooling said gases and vapors, the degree of cooling and of refluxing the gases and vapors with the condensate being such that the gases and vapors pass in contact with a nitric acid condensate containing 80% or more HNO₃, recovering from the resulting gas containing nitrogen dioxide and chlorine the nitrogen dioxide separate from the chlorine, reacting the recovered nitrogen dioxide with aqueous nitric acid to form a concentrated acid containing 70% or more HNO₃, employing thus formed concentrated acid in the decomposition of additional nitrosyl chloride in the manner described above and withdrawing from contact with the gases and vapors a portion of the aforesaid nitric acid condensate containing 80% or more HNO₃.

12. The process for the decomposition of nitrosyl chloride which comprises passing a gas containing nitrosyl chloride in countercurrent flow and in intimate contact with nitric acid of increasing concentrations of HNO₃ as the nitrosyl chloride gas progresses in contact with the acid, and at an intermediate point at which the gas and acid are contacted maintaining the acid at a temperature of 50° C. or higher and at a concentration such that when said acid is heated at a temperature between 50° C. and its boiling point the vapors evolved therefrom contain 70 parts or more HNO₃ to every 30 parts of H₂O.

13. The process for the decomposition of nitrosyl chloride which comprises passing said nitrosyl chloride in contact with a nitric acid solution at a temperature above 70° C., said nitric acid solution being of a concentration such that when heated at a temperature between 50° C. and the boiling point of the solution the vapors evolved therefrom contain 70 parts or more HNO₃ to every 30 parts of H₂O, cooling the resulting mixture of gases and vapors to condense therefrom a nitric acid condensate containing 80% or more HNO₃, withdrawing a portion of said condensate from contact with said mixture of gases and vapors, and refluxing another portion of the condensate in contact with said mixture of gases and vapors.

14. The process for the decomposition of nitrosyl chloride which comprises passing said nitrosyl chloride in contact with a nitric acid solution at a temperature of about 70° C. or higher, said nitric acid solution being of a concentration such that when heated at a temperature between 50° C. and the boiling point of the solution the vapors evolved from said solution contain the same proportions of HNO₃ to H₂O as do the vapors evolved by heating at a temperature between 50° C. and its boiling point an aqueous solution of nitric acid containing about 75% to about 85% HNO₃, cooling the resulting mixture of gases and vapors to condense therefrom a nitric acid condensate containing 90% to 100% HNO₃, withdrawing a portion of said condensate from contact with said mixture of gases and vapors, and refluxing another portion of the condensate in contact with said mixture of gases and vapors.

15. The process for the decomposition of nitrosyl chloride which comprises distilling at a temperature of 50° C. or higher a nitric acid solution of a concentration such that when heated at a temperature between 50° C. and the boiling point of the nitric acid solution the vapors evolved from said solution contain 70 parts or more HNO₃ to every 30 parts of H₂O, cooling the vapors distilled from said acid to condense nitric acid therefrom, subjecting the nitric acid condensate and the vapors distilled from said nitric acid solution to rectification by refluxing the condensate in contact with said vapors, passing a gas containing nitrosyl chloride in direct contact with said nitric acid solution while it is being distilled, whereby said gas is mixed with the vapors distilled from the nitric acid solution and accompanies said vapors during their contact with said condensate in the aforesaid rectification, and in the distillation of said nitric acid solution supplying to the distillation an amount of the acid which contains 4 mols or more of HNO₃ for every 1 mol of NOCl in said gas containing nitrosyl chloride.

16. The process for the decomposition of nitrosyl chloride which comprises passing said nitrosyl chloride in contact with hot nitric acid solution at a temperature of 50° C. or higher, said nitric acid solution being of a concentration such that when heated at a temperature between 50° C. and the boiling point of the solution the vapors evolved from said solution contain 70 parts or more HNO₃ to every 30 parts H₂O, and then passing the resulting mixture of gases and vapors in contact with nitric acid solution of a higher concentration than that of the first mentioned acid to oxidize said nitrosyl chloride to nitrogen dioxide and chlorine, recovering the nitrogen dioxide separate from the chlorine, reacting the recovered nitrogen dioxide with aqueous nitric acid to form a concentrated acid containing 70% or more HNO₃ and employing thus formed concentrated acid in the decomposition of additional nitrosyl chloride in the manner described.

17. The process for the decomposition of nitrosyl chloride which comprises distilling at a temperature of 50° C. or higher a nitric acid solution of a concentration such that when heated at a temperature between 50° C. and the boiling point of the nitric acid solution the vapors evolved from said solution contain 70 parts or more HNO₃ to every 30 parts of H₂O, cooling the vapors distilled from said acid to condense nitric acid therefrom, subjecting the nitric acid condensate and the vapors distilled from said nitric acid solution to rectification by refluxing the condensate in contact with said vapors and passing a gas containing nitrosyl chloride in direct contact with said nitric acid solution while it is being distilled, whereby said gas is mixed with the vapors distilled from the nitric acid solution and accompanies said vapors during their contact with said condensate in the aforesaid rectification to oxidize said nitrosyl chloride to nitrogen dioxide and chlorine, recovering the nitrogen dioxide separate from the chlorine, reacting the recovered nitrogen dioxide with aqueous nitric acid to form a concentrated acid containing 70% or more HNO₃ and employing thus formed concentrated acid in the decomposition of additional nitrosyl chloride in the manner described.

18. The process for the decomposition of nitrosyl chloride which comprises heating at temperatures of substantially 50° C. or higher a gas containing nitrosyl chloride and vapors of nitric acid and water in the proportions of 70 parts or more HNO₃ to 30 parts of water vapor to partly decompose the nitrosyl chloride and then increasing the proportions of HNO₃ vapor to water vapor in the gas while maintaining the gas at temperatures at which the nitric acid reacts with residual nitrosyl chloride contained therein.

19. The process for the decomposition of nitrosyl chloride which comprises heating at temperatures of substantially 70° C. or higher a gas containing nitrosyl chloride and vapors of nitric acid and water in the proportions of 70 parts or more HNO₃ to 30 parts of water vapor and then increasing the proportions of HNO₃ vapor to water vapor in the gas until the proportion of HNO₃ vapor to water vapor corresponds to about 80 to 1 while maintaining the gas and vapors at a temperature of substantially 60° C. or higher.

HERMAN A. BEEKHUIS, Jr.